Oct. 1, 1957     T. L. BEACH, JR     2,807,985
REAR VIEW MIRROR STABILIZING ARRANGEMENT
Filed Feb. 23, 1954
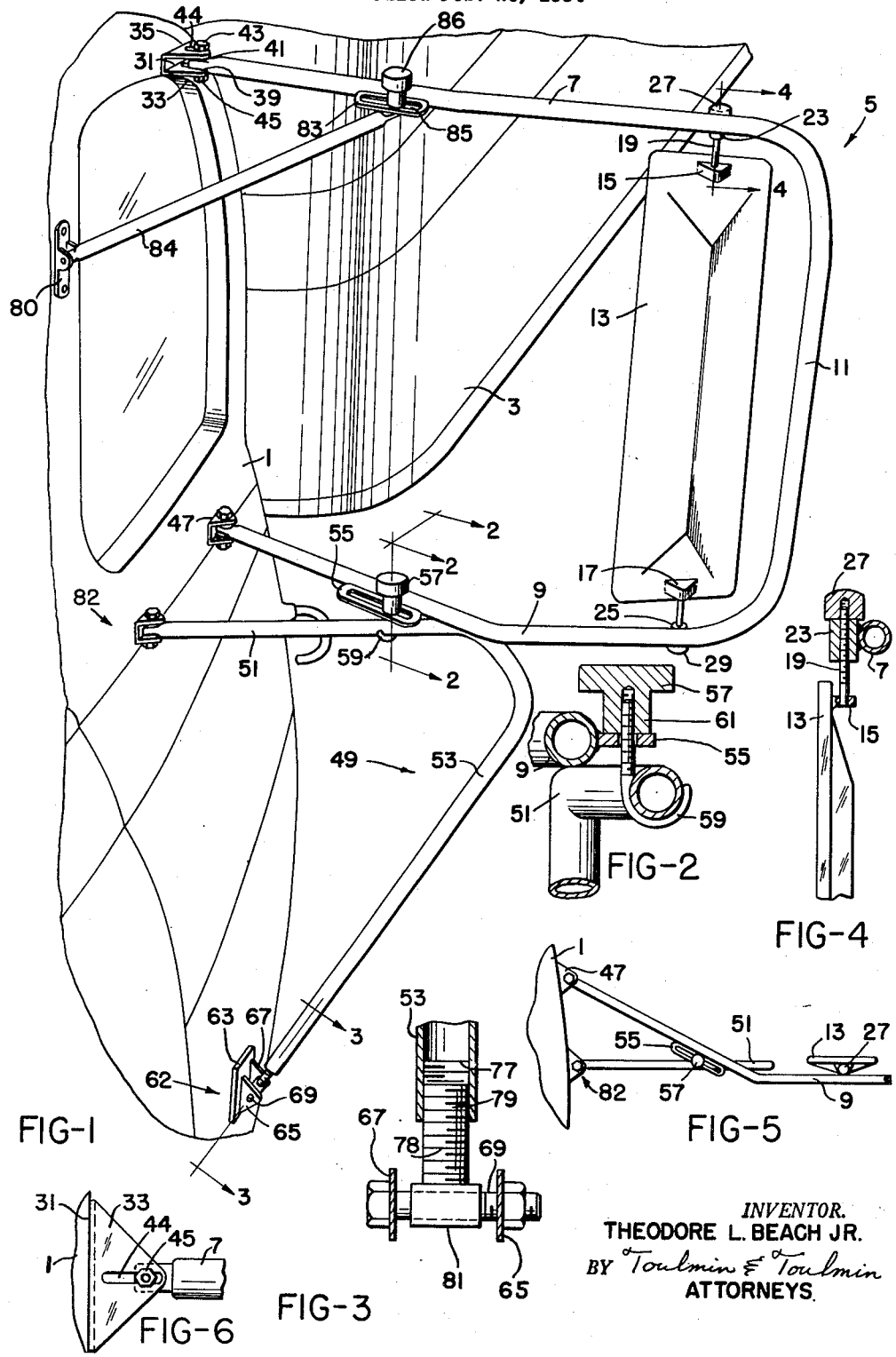
INVENTOR.
THEODORE L. BEACH JR.
BY Toulmin & Toulmin
ATTORNEYS

United States Patent Office 2,807,985
Patented Oct. 1, 1957

2,807,985

REAR VIEW MIRROR STABILIZING ARRANGEMENT

Theodore L. Beach, Jr., New Carlisle, Ohio

Application February 23, 1954, Serial No. 411,676

2 Claims. (Cl. 88—98)

This invention relates to rear view mirrors and more particularly to structural arrangements for supporting rear view mirrors which out-stand from the side of commercial vehicles.

The advent of very long and wide trailer bodies has rendered it difficult for the drivers in the cabs of these trailer trucks to note traffic conditions to the rear and side; to assist in overcoming the difficulties the rear vision mirrors which are mounted laterally of the truck adjacent the drivers position have been enlarged and the arms supporting the same have been lengthened to permit the placement of the mirror at a considerable lateral distance from the cab.

The described arrangement, due to the mirror and arm length, has resulted in placing relatively high localized stresses on the body of the cab, and particularly on the cab doors by which such arms and mirrors are normally supported. Further the arms themselves are subjected to considerable stress and are readily set into vibration by even slight disturbances, and the mirror itself is accordingly frequently set into vibratory movements.

It is a primary object of the present invention to provide a rear view mirror structure which overcomes the above noted defects.

It is a particular object of the present invention to describe a rear view mirror structure in which a rear view mirror is movable inwardly, on its supporting structure, toward the cab by a driver seated in the cab.

It is a further important object of the invention to provide a rear view mirror structure which may be so constructed and arranged in combination with the cab that a driver may, while still observing traffic conditions, ease the mirror slowly inwardly to avoid striking an abutment, platform or building with the extending mirror.

These and other allied objectives of the invention are attained by the structural characteristics and relative arrangements of elements in the preferred embodiment of the invention hereinafter more fully described in connection with the accompanying drawings wherein:

Figure 1 illustrates the structure of invention secured to the door of a cab;

Figure 2 is a view taken on line 2—2 of Figure 1;

Figure 3 is a view taken on line 3—3 of Figure 1;

Figure 4 is a view taken on line 4—4 of Figure 1;

Figure 5 is a plan view of a portion of the structure of Figure 1; and

Figure 6 is an enlarged view of another portion of the structure of Figure 1.

Referring to the drawings, first particularly Figure 1, there is shown at 1 a door of a cab having a trailer 3 and which door is provided with an extending bracket of tubular rod construction indicated generally at 5. Bracket 5 comprises an upper arm 7 and a lower supporting arm 9 and a side arm 11; the upper and lower arms, 7, 9 are bent (Figure 5) to provide a maximum extension of the bracket at a minimum of arm length in order to insure of adequate and convenient viewing by the driver in the cab.

Mirror 13 is supported at the outer extremity of the bracket 5 and the mirror is provided on the rear side thereof with bosses 15, 17. Pins 19, 21 are secured respectively in the bosses 15, 17; these pins pass through studs 23, 25 secured respectively on the arms 7, 9 and the pins are threaded at their upper ends to receive nuts 27, 29. When the nuts 27, 29 are secured he mirror is rigidly held; upon loosening of the nuts, the mirror and the pins together may be rotated in the studs to position the mirror in any desired vertical plane.

Other means of securing the mirror to the bracket 5 may be utilized if desired in the practice of this invention.

The bracket 5 is supported from the cab door 1 for swiveling movement and the bracket may be moved together with the mirror inwardly toward the forward end of the cab from the position shown in Figure 1 to permit the safe passage of the bracket and mirror past obstructions such as platforms and abutments and to permit the movement of the truck through alleyways, for example, where the bracket might strike a building. For this purpose the upper tubular arm 7 is flattened at its inner end and provided with a circular hole; retaining bracket 31 secures the arm and has the rear portion thereof secured to door 1.

The horizontally extending ears 33, 35 are provided with slots 44 and a threaded bolt is adapted to pass through the slots of the ears and the hole of the arm 7 in registration. The slots are provided to permit selection of the position of the retaining bracket on the door; since such doors are variously shaped and different doors may require slightly different length of arm 7 the same is readily attained by movement of the arm along the slot of the bracket 31. Washers 39, 41 are conveniently provided between the ears 33, 35 and the end of the tubular arm 7 to permit of free rotational movement of the arm on the bolt.

Nuts 43, 45 are so secured on the opposed threaded ends of the bolt as to permit movement of the arm 7 while retaining the arm positioned on the bolt for the rotational movement; the nuts when once tightened with the arm in proper position do not usually again require adjustment.

The lower supporting arm 9 is secured to the door 1 directly beneath and in line with the bracket 31 by the retaining bracket 47 and accordingly free rotative or swiveling movement of the bracket 5 is provided for; the pivotal structure of arm 9 is similar to that of arm 7 except that bracket 47 is not slotted and accordingly the former is not described in detail, but it should be particularly noted that the pivot bolt of bracket 47 lies directly beneath the pivot bolt of bracket 31 in the preferred arrangement and the slot 44 permits such alignment.

The mirror 13 and the weight of the bracket 5 itself tends to bow the arms downwardly and to occasion excessive localized stresses at the retaining brackets 31, 47 on the door 1. Accordingly a stabilizer bracket indicated generally at 49 is secured to the door 1 and is provided with an upper laterally extending tubular arm 51 and a lower tubular arm 53 which extends upwardly to intersect arm 51. Arm 51 as shown in Figure 1 passes beneath the mirror supporting arm 9 in contact therewith and accordingly the arm 51 provides a support for the mirror and the mirror supporting arm 9 and prevents distortion of the arm 9 as well as decreasing the stress at the retaining brackets 47, 31.

To inhibit vibration of the structure the arms 51 and 9 are locked together and for this purpose the arm 9 is preferably provided adjacent the point of cross-over of the arms with a slotted clamping ear 55 through the slot of which bolt and nut clamp means extend. This clamping means, as shown more clearly in Figure 2, provides a conveniently headed plastic knob nut 57 and a J-bolt 59, the upper end of which is threaded and secured in the nut 57 and the lower end of which passes downwardly and partially around the supporting stabilizing arm 51 in the secured position of the clamping means. The shank 61 of the nut 57 engages the clamping ear 55 at the sides thereof which define the slot to prevent passage of the nut through the slot. A washer as of rubber may be inserted between the knob nut and clamping ear if desired.

It is thus seen that an operator in the cab may reach therefrom to either tighten or loosen the nut 57; as shown in Figure 2 the nut is in a tightened position and accordingly the arms 51, 9 are in firm engagement. When the nut 57 is loosened the J-bolt 59 tends to drop away from the arm 51 (Figure 2) and an inward pull on the nut 57 by an operator in the cab will permit the arm 9 to slide inwardly toward the cab over the arm 51. Thus the mirror 13 is readily removed to a point of safety from obstructions and the operation may be performed while the mirror is being viewed since the J-bolt 59 will continue to be partially around the arm 51 though in loose contact therewith; accordingly the arm 51 and J-bolt 59 serve as guide means for movement of the bracket 5 and mirror 13.

Since the doors of the cab to which the brackets are to be secured vary in contour and angularity and since the arm 51 extends in a substantially horizontal plane the bracket 49 is preferably supported in the manner illustrated in Figures 1 and 3.

Thus the arm 53 is preferably made to be secured to the truck by holding means 62 which includes a plate member 63 secured to the door of the truck and from which plate member there extends a pair of vertically disposed ears 65, 67 suitably apertured for the receipt of a headed bolt 69 (Figure 3). The bolt itself is threaded and provided with retaining nut which is secured against ear 65. The bolt 69 receives loosely thereon a tubular collar 81 from which there extends preferably integral therewith a shank 79 threaded externally at 78 and which threads engage the internal threads 77 of arm 53.

To position the stabilizer the holding assembly 82 with bracket 5 positioned, is secured to a door and the arm 51 is engaged by the J-bolt 59 as shown in Figures 1 and 2. The lower arm 53 is then installed while maintaining arm 51 horizontal by screwing the shank 79 with the tubular arm 53 to such an extent that the extending outward length of shank 79 (and collar 81) permits the collar to be aligned with openings in the ears 65, 67 through which bolt 69 passes; with the bolt in position through the collar the nut is tightened against ear 65 to secure the structure. Thus the arm 51 may be readily positioned horizontally for engagement with J-bolt 59 on any conventional truck door.

A holding assembly indicated generally at 82 for arm 51 is similar to that described in connection with arm 9 and provides for positioning of arm 51 when mounting the stabilizer bracket 49.

However it is to be understood that for a given contour of door it is not necessary that the holding means 62 provide for adjustment of the arms 51, 53 as the bracket 49 consisting only of a bent tubular member may be so constructed and arranged with plates welded to the ends thereof that the plates may be rigidly secured to a given door to support the bracket 49 in desired position; also it is to be noted that the plates, for example that shown at 63, may be selected to conform to the contour of the particular cab section to which they are to be secured.

Referring now again to Figure 1, it is to be noted that the upper arm 7 may, similar to lower arm 9, be provided with a clamping ear indicated at 83 and a slot indicated at 85. This feature permits the bracket 5 to be utilized either on the right hand side or the left hand side of a cab simply by a reversing of the bracket.

Also to provide for completely rigid support of bracket 5 a bracket 80 pivotally supports an upper stabilizer arm 84 which at its outer end carries a threaded bolt upon which a plastic nut 86 is received and which nut fastens down against the clamping ear 83. When upper stabilizer arm 84 is employed a driver may remove nut 86 and push arm 84 downwardly until it is clear of the clamping ear and then arm 9 may be slid on arm 51 as already described by simply loosening nut 57.

Loosening of nut 57 need only be sufficient to permit of sliding arm 9 on arm 51; the J-bolt may still then engage loosely about arm 51 and will prevent any rapid swinging of the arm should the operator be required to remove his hand from the knob nut 57.

The arm 51 with its clamping ear 55 permits sliding movement of the mirror arm 9 thereon, to permit clamping of the mirror arm 9 thereto and to permit guiding of the mirror bracket in its motion inwardly and outwardly of the cab.

It is further to be noted that while other arrangements of the clamping ear 55 may be employed it is preferable that the ear and slot extend in parallel horizontal planes with the arms 51 and 9 and that the nut 57 be readily accessible to the driver of the vehicle where he may watch the mirror as he slides it inwardly.

It is thus to be noted that I have set forth a rear-view mirror structure which is adequate to overcome the tendency of the light weight tubular arms to bend under stress and which provides means for movement of the mirror without the necessity of the driver leaving the seat; also it is to be noted it is not necessary for the cab door to be moved in order to position the mirror. Further, the tubular structure provides both rigidity and sliding surfaces and the planar arrangement of the tubular arms in supporting engagement is readily adaptable for relative movement of the arms; and in conjunction with the clamping means to provide for secure positioning and support of the whole structure when even the heaviest of mirrors is mounted on the mirror-supporting bracket.

It will be understood that this invention is susceptible to modification in order to adapt it to different usages and conditions and accordingly, it is desired to comprehend such modifications within this invention as may fall within the scope of the appended claims.

I claim:

1. A rear view mirror structure for a vehicle comprising: a mirror-supporting bracket having tubular spaced, horizontal, parallel upper and lower arms; a mirror supported between the arms at one extremity of the bracket; means for pivotally securing the bracket to a vehicle, said means being constructed and arranged for bracket movement horizontally; a stabilizer bracket having a horizontally extending tubular arm supportably engageable with the lower arm of said mirror-supporting bracket, the two latter said arms being relatively slidable, extending transversely to each other and defining a point of crossover; and clamping means carried by the said lower arm of the mirror-supporting bracket, said clamping means comprising a slotted clamping ear, a J-bolt and a nut, the J-bolt engaging about said tubular stabilizer arm and being lockable thereto in a secured position of the nut, the J-bolt being slidable with said lower arm over said stabilizer arm in the unlocked position of the nut.

2. In combination in a rear view mirror structure for use with a vehicle; a mirror-supporting bracket having tubular, vertically spaced, parallel arms adapted to extend horizontally, the lower of which arms between the extremities thereof is provided with a slotted clamping ear; means at one extremity of the bracket for securing a mirror to the arms and at the other end means for pivotally securing the bracket to a vehicle; a mirror supported between the arms at said one extremity of the bracket; a stabilizer bracket having means for securing the same to the vehicle below the mirror supporting bracket, the stabilizer bracket having an upper horizontal tubular arm for supportably and slidingly engaging said lower arm of the mirror-supporting bracket, the two arms in the slidably engaged position defining a point of crossover; a J-bolt and a nut thereon supported by the clamping ear, the J-bolt being arranged to engage about said arm of the stabilizer and to slide in the clamping ear in a released position of the nut, the nut being within reach of a driver in the vehicle and being movable by a driver along the slotted clamping ear to move the mirror-supporting bracket.

References Cited in the file of this patent

UNITED STATES PATENTS

| | | |
|---|---|---|
| 1,584,938 | Higbee | May 18, 1926 |
| 1,795,871 | Lehmann | Mar. 10, 1931 |
| 1,848,064 | Oishei | Mar. 1, 1932 |
| 1,893,245 | Ritz-Woller | Jan. 3, 1933 |
| 2,035,411 | Udell | Mar. 24, 1936 |
| 2,047,325 | Jones | July 14, 1936 |
| 2,552,074 | Thompson | May 8, 1951 |
| 2,565,012 | Barrett | Aug. 21, 1951 |
| 2,616,648 | Budreck | Nov. 4, 1952 |
| 2,626,539 | Peterson | Jan. 27, 1953 |
| 2,643,847 | McDevitt | June 20, 1953 |
| 2,696,964 | Ringwald | Dec. 14, 1954 |
| 2,708,086 | Prutzmann | May 10, 1955 |